Nov. 1, 1932.　　　J. A. H. BARKEIJ　　　1,885,576
INTERNAL COMBUSTION ENGINE
Original Filed Feb. 15, 1928　　2 Sheets-Sheet 1
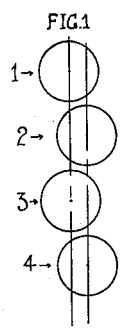
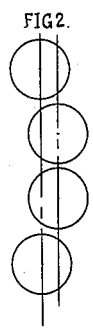
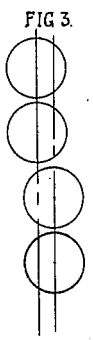
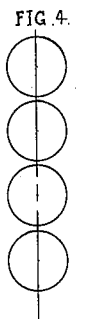
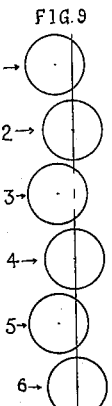
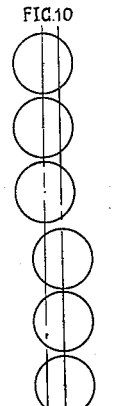
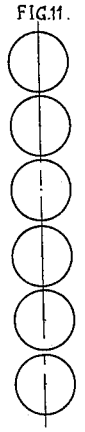
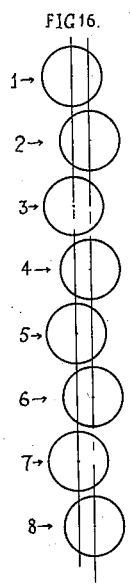
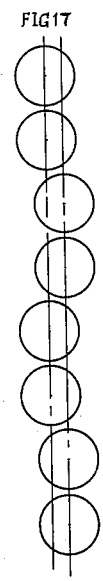
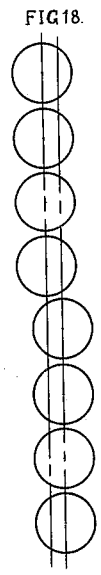
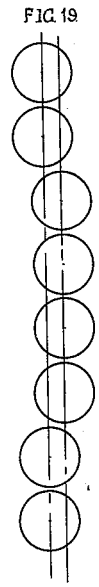
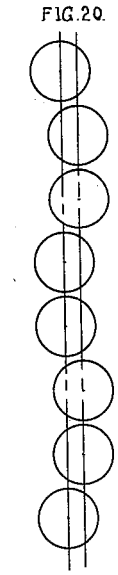
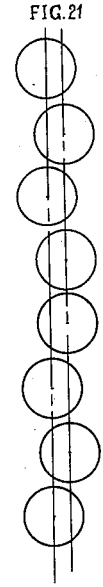
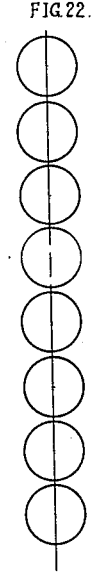
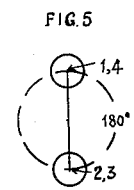
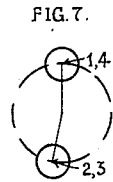
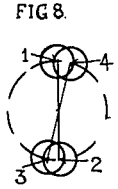
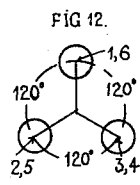
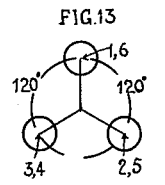
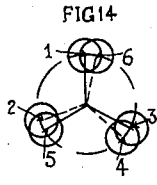
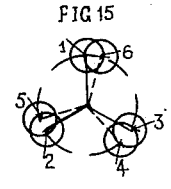
*Inventor*
J.A.H.Barkeij

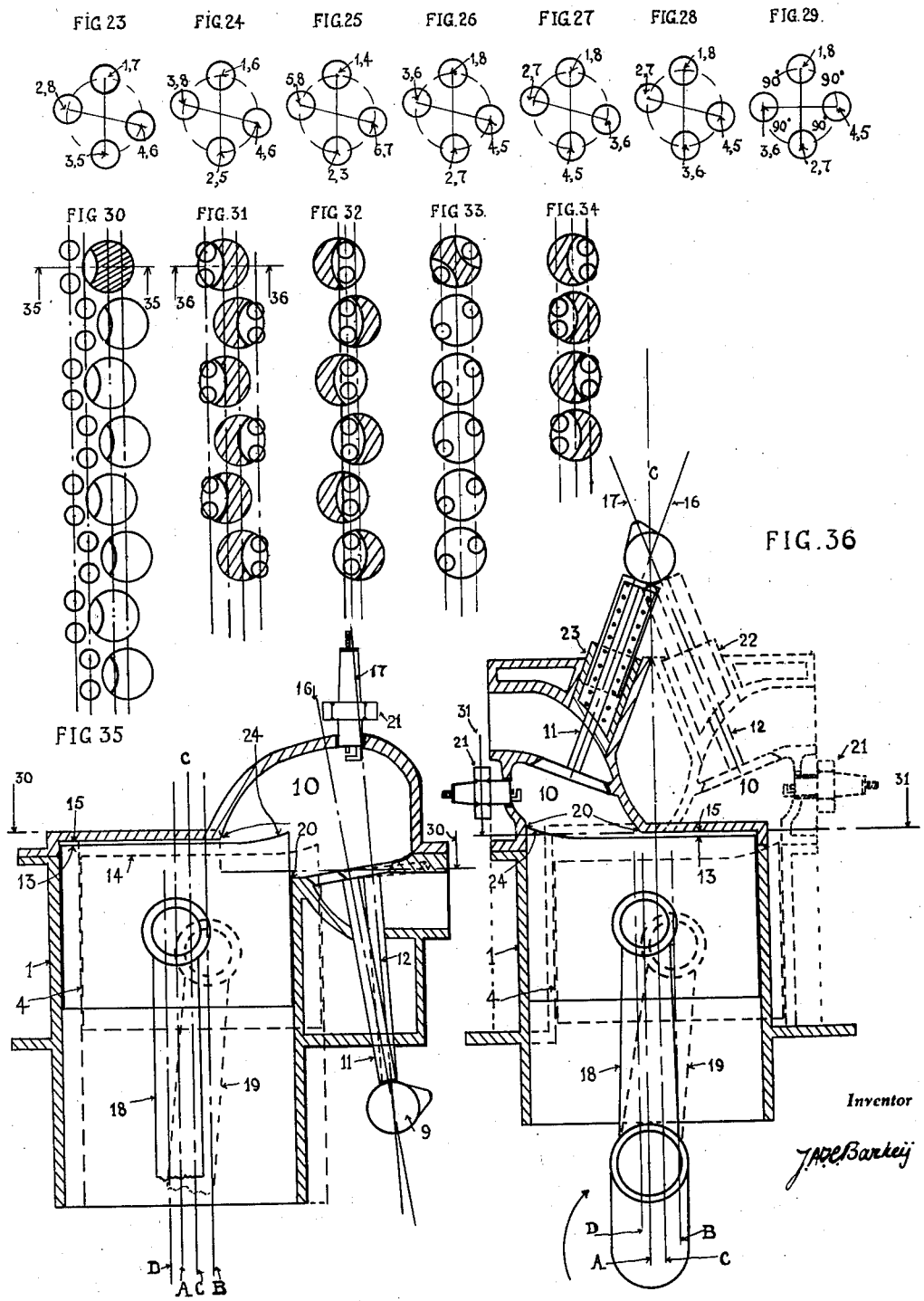

Patented Nov. 1, 1932

1,885,576

UNITED STATES PATENT OFFICE

JEAN A. H. BARKEIJ, OF ALTADENA, CALIFORNIA

INTERNAL COMBUSTION ENGINE

Original application filed February 15, 1928, Serial No. 254,543. Patent No. 1,773,072, dated August 12, 1930. Divided and this application filed August 26, 1930. Serial No. 477,972.

The present application is a continuation in part of my Patent No. 1,776,760, Sept. 23, 1930.

My first object is to arrange the cylinders, 4, 6, 8 etc. in a straight line, but the two inverted valves, belonging to each cylinder, alternately on opposite sides of the plane (vertical) of the cylinders.

My second object is to combine said in line arrangement of said cylinders and valves, with a crankpin arrangement, in which the sets of two crankpins at an equal distance of a vertical plane of symmetry through the approximate center of the crankshaft, are offset from each other a certain number of degrees, for a fourstroke cycle engine not more than 720°, divided by double the number of cylinders, or 360° divided by the number of crankpins. In case more than one row of aligned cylinders are arranged radially around the crankshaft, said angle may be decreased to less than 720°, divided by double the number of cylinders or 360° divided by the number of crankpins, as already explained in my application 753,608, of Dec. 4, 1924, and Patent No. 1,722,950 of July 30, 1929.

My third object is to combine said two previous objects with an overhead single camshaft for each row of aligned cylinders, lifting the said inlet and exhaust valves directly.

My fourth object is to arrange the cylinders of one row of 4, 6, 8 etc. cylinders in a straight line, and to arrange the two inverted valves, belonging to each cylinder, all in a straight line as is customary in ordinary, standard, automobile and aeroplane motors, and to combine this cylinder arrangement with the crankpin arrangement of the sixth and seventh object.

My fifth object is to combine the said first and said fourth object with a special form of combustion chamber having a restricted passage between the cylinderbore and the combustion chamber, combined with such a position of said inverted valves, that both of said valves, (or at least one i. e. the inlet valve) are located in inverted position over said restricted passage, and at the same time overlapping in more or less degree (depending upon the size of the valves in relation to the size of the cylinderbore), or not overlapping but above, said cylinder bore. Said restricted passages should be greater than the effective inlet valve area, but smaller than the cross section of the cylinderbore. Any size between these two dimensions falls under the scope of this invention—(see Fig. 34, outer and inner cylinders, or Fig. 32 compared with Fig. 31).

My sixth object is to arrange the 4, 6, 8 etc. cylinders in a straight line, arranging the crankpins of the corresponding crankshaft so that one half, the right and left half, has its crankpins arranged symmetrically and radially at an angle of 360°, divided by half of the number of cylinders of one group of cylinders in a straight line, (see Figs. 8, 14, 15, 25), said two groups of crankpins arranged at an angle of 360°, divided by the number of cylinders, or smaller.

My seventh object is to arrange 8, or a multiple of four cylinders in a straight line, combining said arrangement with a crankshaft having its crankpins arranged symmetrically with respect to a vertical plane of symmetry through the approximate middle of the crankshaft (Figs. 26-28), said cylinder arrangement combined with a valve arrangement in which each set of two valves of said cylinders, by preference inverted, are placed alternatively on opposite sides of the vertical plane of the axes of said cylinders.

My eighth object is to arrange the cylinders in two planes, half of the cylinders in one plane, the other half in the other plane, combining said arrangement with a crankpin arrangement, whereby equal intervals between successive firing intervals are obtained for said two groups of cylinders, the order of firing being equal to that of an engine with an equal number of cylinders arranged in a line and a crankpin arrangement, which is symmetrical to a vertical plane of symmetry through the center of said crankshaft. (See appl. 753,609 Dec. 3, 1924, renewed in application No. 414,809 of Dec. 17, 1929.)

My ninth object is to arrange 4, 6, 8 etc. cylinders in two planes, half of the cylinders in one plane, the other half in the other plane, parallel to the said first plane, combining said arrangement with a symmetrical crankpin arrangement, as explained in the seventh object. This arrangement results in unequal firing intervals for such a group of 4, 6, 8 cylinders, but with a firing order equal to that of the seventh and eighth objects. This arrangement is claimed in the Patent No. 1,776,760, 23 Sept., 1930 and Patent No. 1,722,950, 30 July, 1929.

My tenth object is to combine said cylinder arrangements with an L-head valve arrangement, or with a valve-in-head arrangement having different characteristics, as will be explained later. In the L-head arrangement the valves are placed in two planes, if the cylinders are placed in two planes. In the valve-in-head type the valves may be placed in two planes, they may be placed in one plane, irrespective of the cylinder arrangement in one or two planes. In both types if the valves are placed in two planes, the cylinders can be placed closer to each other, as there is more room for the combustion chambers surrounding said valves. (Figs. 35, 36.)

My eleventh object is to arrange the cylinders in two planes parallel to each other or at a small angle (about 20°–35°), but to place the two sets of valves of each cylinder in a straight line. (Fig. 32.)

My twelfth object is to arrange my crankpins in as many radial planes as, there are crankpins on a crankshaft, combining said arrangement with a single row of cylinders radially arranged with respect to the axis of said shaft, or with multirows of cylinders radially arranged.

My thirteenth object is to leave a restricted passage between the under surface of the head and the piston in top position to have the pressure of the explosion over the entire surface of the piston, when said piston approaches said head, when ignition takes place before the piston reaches top position, or not later than said moment. In the standard Ricardo head, as proposed in Patent 1,474,003 to H. R. Ricardo, filed December 31, 1919, the piston approaches said head at a minimum distance so that when the pressure is about a maximum in the combustion head, the pressure will be on one side of the piston and cause the piston to rock in said cylinder, causing a certain well known knock, called piston-slap, or detonation, or pinking. In the present arrangement the piston approaches the head at more than a mechanical minimum, but still at such a distance that there is a squeezing effect left between head and piston to cause a turbulence in the gases in the said chamber. It is evident that this feature may be equally applied on L—, F—, or overhead valves-engines, provided there is such a restricted passage between the combustion chamber in the head and the cylinder bore to provide an overhang of the cylinder over the cylinder bore, as shown in said Ricardo patent. This thirteenth object can be of, course, combined with any of the other twelve objects.

In the present application the first, third, fourth, fifth, seventh and thirteenth objects are claimed separately, or in combination with each other.

Realizing that the present invention may be embodied in constructions other than those specifically shown, it is particularly understood, that the said arrangements of cylinders may be multiplied radially, so that the cylinders in said groups, be they per group in line, or in two groups parallel to each other or at a slight angle, may be arranged in a V, W, Y or X type, or even in more radial directions. The firing per group of 4, 6, 8 cylinders may be again regular or with irregular intervals, but for each group the order of firing will be here by preference irregular, as explained under the sixth object. The firing between the cylinders, if more than one group is applied radially, may be again even or with uneven intervals in the latter case, where the firing is irregular for one group of 4, 6, 8 etc. cylinders.

Figs. 1–4, 9–11, 16–22 represent the horizontal sections through the cylinders of multicylinder engines of an internal combustion engine.

Figs. 5 8, 12 15, 23 29 are end views of the arrangements of the crankpins of various crankshafts, to be combined with various cylinder arrangements shown.

Fig. 30 shows the horizontal partial section through Fig. 35 as shown, and Fig. 35 shows the vertical section through the cylinder and restricted passage shown in Fig. 30. Both represent an L-head engine.

Fig. 31 shows the partial horizontal section S31 of Fig. 36, and Fig. 36 shows the vertical section S36 of Fig. 31. Both represent a valve-in-head engine.

In these two Figures 35 and 36, the section lines do not run through the dividing line between cylinder head and cylinder, but it is, of course, supposed that the cylinder head and cylinder can be made in one piece, or the dividing line could have been made higher, where the top of the piston approaches the undersurface of the head, when the piston is in top position.

The present dividing line has been made lower for reasons to be explained later, which have nothing to do with the particular form of the combustion chamber, particular situation of the valves, or particular situation of the restricted passage between combustion chamber and piston chamber.

Fig. 32 is a horizontal section at the same level, as that shown in Fig. 36, but the valves are here placed in a single vertical plane, while the cylinders are arranged in two vertical planes, parallel to each other (or at a slight angle, see Appl. 753,609, Dec. 3, 1924 and Patent 1,722,950, 30 July, 1929).

Fig. 33 is a similar horizontal section, but the two valves per cylinder are placed in two planes at a slant towards each other, at an angle towards the plane of the axes of the cylinders arranged in a single row. For the same valve arrangement the cylinders may be here again arranged in two planes parallel to each other or at a small angle. This type has been explained more extensively in my divisional application No. 254,543, Patent 1,773,072, 12 August, 1930.

Fig. 34 shows the cylinders arranged in a straight line, the two valves per cylinder, however, are placed at an angle towards each other, towards the plane of the cylinders, alternatively on opposite sides of said cylinder plane (the valves may be, of course, perpendicularly inverted, if so desired for reasons of construction). It is, of course, understood, that the valves may be placed in a single row as shown in Fig. 32, when said cylinders are also in a single row as shown in Fig. 34, and the valves may be perpendicularly inverted, like in the other cases. In this application, the combination of Fig. 4 with the crankpin arrangement of Fig. 6 for the four cylinder, the combination of Fig. 11 with Fig. 14 or 15, for the six cylinder, and the combination of Fig. 22 with any of the crankpin arrangements of Figs. 23—28, will be more closely considered, in itself and in relation to Figs. 35, 36. In the combination of Figs. 4 and 8, the piston-top and bottom center position intervals between cylinder 1 and 2, and those between cylinder 3 and 4 are equal, but between these two groups of two cylinders unequal in proportion, of course, to the offset of the crankpins 1 and 4, and 2 and 3. If this angle is only about 6°, the intervals for the firing order 1, 3, 4, 2 is respectively 180–6°, 180°, 180°+6°, 180°, when cylinder 1 starts to fire.

If the angle is increased to less than 90°, or 90°, the same firing order can be obtained, but the intervals differ then 180−(90° or less), and 180°+(90° or less). If more than one row of cylinders is applied, the less this irregularity will affect the torque of the engine, and the less will the unbalance of the reciprocating parts be felt if said offset of the crankpins is increased to said maximum. The offset should be, preferably, not more than the number of degrees of the cycle of the engine, that is 720°, divided by double the number of crankpins of the engine, as with regular firing the intervals between successive firings is, of course, 720° divided by the number of crankpins. If the crankpins are arranged symmetrically, as shown in Fig. 5, the firing is, of course, in a straight arrangement of the cylinders with equal intervals, and if more than one row of cylinders are arranged radially, the firing between the different rows of cylinders may be made again irregular or simultaneous. Such an arrangement of the firing is not always desired, consequently, a greater differentiation in the radial arrangement of the cylinders may be obtained, if the crankpin arrangement is not as shown in Fig. 5, but as shown in Figs. 6, 7, 8, that is also more differentiated. The combination of Fig. 34 with said Figures 6, 7, 8, results in unequal firing intervals, provided the order of firing is maintained 1, 3, 4, 2 or 1, 2, 4, 3. Said different arrangements of Figs. 6, 7, 8, may be also of the utmost utility in a greater number of radially arranged rows of cylinders. The balance in any of such arrangements can be maintained much better, provided the offset of said crankpins does not exceed 90° for four crankpins, and preferably 45°, or less than that, depending, of course, on the number of rows. The irregularity of the firing, due to said offset of the crankpins, as shown in Figs. 6 and 7, 8 is again accordingly their offset position. If multiple rows are applied the firing for all the rows can again be made to be regular or irregular, depending upon the angle of the various rows and the angle of the offset of the crankpins, there being of course, as many connecting rods on one crankpin as there are rows of cylinders radially arranged. In all these combinations it is supposed that the crankshaft is placed in the plane of all the rows of cylinders. Similarly for the six cylinder in the combination of Fig. 11 with Figs. 14 and 15. In a standard six cylinder, with aligned cylinders and symmetrically arranged crankpins, there are 8 different firing orders. These orders are effected by a clockwise and counterclockwise rotation of the crankshafts, as shown in Figs. 12, 13.

In the combination of Fig. 11 with Fig. 14, for a firing order 1, 5, 3, 6, 2, 4, the firing intervals are respectively, for a clockwise rotation and cylinder 1 firing, 120°, 120°, 120°−X°, 120°, 120°, 120°+X°. For a firing order 1, 2, 3, 6, 5, 4 the respective intervals are 120°−X°, 120°+X°, 120°−X°, 120°+X°, 120°−X°, 120°+X°. Therefore, like in the four cylinder, a different firing order results in different firing intervals, if the same crankpin arrangement and the in-line-arrangement of the cylinder is used. The greater again the offset of X degrees is, the greater is the difference between the successive firing intervals. The offset X can again, however, not be greater here than 60°, otherwise the firing order will differ, or rather can differ, from the standard arrangement of aligned cylinders and symmetrical arrangements of the elements reciprocating the pistons (for a four-stroke cycle).

In the combination of Fig. 11 with Fig. 15

15, the intervals for the firing order 1, 5, 3, 6, 2, 4 are respectively, when cylinder 1 fires and the crankshaft rotates clockwise, $120°-X°$, $120°+X°$, $120°-X°$, $120°+X°$, $120°-X°$, $120°+X°$. For the firing order 1, 2, 3, 6, 5, 4, the intervals are respectively $120°$, $120°$, $120°-X°$, $120°$, $120°$, $120°+X°$. We see that the firing intervals with the same two firing orders for these two types of crankshafts are each others reverse, therefore there might not be much to choose between the two types, except from a practical standpoint of great importance. Crankshafts with throws in more than one plane, as the ones shown in Figs. 6, 7, 8, 12, 13, 14, 15, 23–29 are forged in the first place with all throws in the same plane and are then twisted, while hot, in a special machine; accurate angles and accurate alignment of the main journals being very important. The less bending the shaft is subjected to, the better, as the crankshaft is as a rule weakest, where the twisting took place. The great difference now, between the type of Figs. 14 and 15, and the type of Figs. 6 and 8, and Figs. 25 and 23–28 is that the successive angles between the successive crankpins 1, 2, 3, 4, 5, 6 in the type of Fig. 14 is irregular, i. e. $120°-X°$, $120°+X°$, $X°$, $120°-X°$, $120°+X°$, and between crankpin 6 and 1, again $X°$. In the type of Fig. 15, the first 3 crankpins are under an equal angle to each other, i. e. $120°$, and the other half are under the same angle, the two halves are under the angle $X°$, being $60°$ or less. The machine, which has to twist the crankshaft 14, is much more difficult to make than the one for the type of Fig. 15. The same condition obtains between the type of Figs. 6, 7 and that of Fig. 8, the latter being easier to make than the former for the same reasons. Crankpin 1 and 2 in the latter are in one plane, crankpin 3 and 4 are in another plane, radially offset from said first plane $X°$, being in the four cylinder type only $90°$, or less, to preserve the standard firing order and standard balance as much as possible, like in the six cylinder and the eight cylinder type described now. For the eight cylinder type, Fig. 22 should be combined with the crankpin arrangement of Figs. 23–28, though of course, the eight crankpins may be arranged in eight planes, duplicating at about $90°$ angle the three arrangements, as shown in Figs. 6, 7, 8 for the four cylinder. One set of four crankpins may be set $90°$ on the first set of four crankpins, the crankpins being then arranged in as many radial planes as there are cylinders in one row, except for the type of Fig. 7. However, the types shown in Figs. 23–28 are again easier to make for the same reason, as explained for the types of Figs. 14, 15 for the six cylinder. Among the types of Figs. 23–28, that of Fig. 25 is easier to make than any of the others, as the first four crankpins are in one plane, and the other four in a second plane, these two planes at an angle less than $90°$, but by preference more than $45°$, as the balance will be maintained better the more the position of the crankpins approaches the standard symmetrical position.

Each of the crankshafts shown, combined with in-line arrangement of the cylinders, will have 16 different firing orders, depending upon the direction of rotation of the crankshaft. For the types of Figs. 23, 24, 26–28, having the crankpins 1, 2, 3, 4 and 5, 6, 7, 8 in the same angular position, the firing intervals will resemble each other in their irregularity for one group of eight aligned cylinders, more than for the type of Fig. 25, in which these four crankpins are in one plane. The balance of the secondary inertia forces in Fig. 25 have however a couple in a horizontal plane for a single row of eight cylinders, while this couple is less in the arrangement of Figs. 23, 24, and entirely eliminated for the last three types of Figs. 26, 27, 28. However, if more than one row of 8 cylinders are applied, for instance two rows at an angle of $45°$, as is proposed in my previous application of July 16, 1925, No. 44,128, this couple of the secondary inertia forces is decreased. If these rows of 8 cylinders are placed at a greater angle than $45°$, they will be further decreased; and also, if four rows of eight cylinders are composed of two rows at $45°$, doubling said type by placing them opposite each other. The practical difference then between the type of Fig. 25, those of Figs. 23, 24, and those of Figs. 26, 27, 28 is not so very great, and the difficulty and cost of making same, becomes important. It may under certain circumstances be advantageous to place the rows of cylinders under irregular angles radially, and, like in the four and six cylinder type, the various arrangements of the crankpins in eight radial planes (duplication of Figs. 6, 7, 8) or in four radial planes at an angle diverging from $90°$, Figs. 23–28, may be useful to retain the utmost balance in such huge engines, together with regular firing, if so desired. The smaller the number of cylinders of course, the greater the firing interval between successive firings will be, ($720°$ divided by the number of cylinders, if a four-stroke engine, $360°$ divided by the number of cylinders for a two stroke of course) and the more regularity of firing is desired, (otherwise the advantage of greater torque, due to more successive explosions would disappear) and the smaller the irregularity between successive intervals should be, to increase overlapping of strokes. For a 4 row, 4 crankpin engine, the intervals would be $45°$, and the irregularity, if desired, should not exceed $22,5°$. Similarly for a 4 row, 6 cylinder type, it should not be more than $15°$, for a four row 8 cylinder not more than 11,¼°. If five, six, seven, eight, nine rows are arranged radially, slight irregularity between intervals becomes gradually of less importance, it would not affect the balance of the engine, provided the proposed crankshafts are used.

If the standard V type eight, twelve, or sixteen cylinder, as shown in my said application 44,128, have respectively an angle of 90°, 60°, 45°, to obtain equal firing, it is evident, that if said constructions are duplicated opposite each other, that the angle between the two sets becomes respectively for these three types 90°, 120°, 135°, and the firing intervals overlap each other or are irregular, of course, as for a duplication of the V, the firing intervals should be cut in two, and become respectively 45°, 30°, and 22,5°. If there is an angle of respectively 90°, 120°, 135° between two rows of cylinders, it is evident that explosions will overlap in these three types, as the angle of the crankpins of Figs. 5, 12, 13, 29 coincide with the angle of at least two rows of cylinders, and the advantage of more cylinders disappears so far the torque is concerned. Therefore the crankpins have to be diversified over the entire circle, in order to overcome said coinciding explosions, and perfect regularity, or slight irregularity of firing without coinciding (simultaneous) explosions will occur. This is merely a matter of plain arithmetic for every specific case, in which more than one row of cylinders are applied. The crankpins are therefore for the four crankpin type in four radial planes, as shown in Figs. 6 and 8, provided the angle between the highest and lowest numbered crankpin does not exceed 90°, and for the other two crankpins the same. For the six crankpin type, this angle between these two crankpins of three pairs, which are per pair at an equal distance from said symmetrical vertical plane, should not exceed 60°, and for the 8 crankpin type not exceed 45°. For the latter type, however, a new type is preferred, as shown in Figs. 23–28 for reasons of economical production. These latter types will, of course, produce coinciding firing for a four row type of engine in two radial planes, as four crankpins are in one plane, unless the four rows are again so placed that two rows are not under an angle of 180°. If they are, the crankpins have to be in eight radial planes. The same obtains for the 4 row, six cylinder type. If two rows are at an angle of 120° coinciding firings cannot be avoided for the type of crankshaft of Figs. 12, 13, the standard types, but the types of Figs. 14, 15 should be used. As soon as the angle is not 120°, f. i. 100° or 90°, for two rows, the types of Figs. 12, 13 can be used again, if so desired.

Another aspect of the multiple row engine has been considered in view of Figs. 35 and 36. In a D-type the valves are usually lifted for both rows of cylinders by a single camshaft. For an 8 cylinder with 90° angle between the cylinders, this is not yet so very objectionable, as practice in and outside garages, in overhauling such types, has proved. For the 12 cylinder with 60°, this circumstance becomes already very annoying, for automobile and aeroplane engines of this type alike. For a sixteen cylinder with cylinders at an angles of 45°, this construction is practically prohibitive, and for this reason the overhead type of valve lifting for the multirow type of engine, is shown in Fig. 36, as a contrast to the L-head type in Fig. 35. The latter type has also other disadvantages with respect to volumetric efficiency, which makes this type also in this respect more or less unsuitable for the high-efficiency type of automobile or aeroplane type of engine of the multirow type, or even single row type. In the L-head type of Fig. 35, the gases, especially the inlet gases have to make a double 90° curve, to enter the cylinder from the inlet manifold. Therefore it is proposed here in Fig. 35, to lower the valves below the top position of the piston, thereby providing an easier entrance and in Fig. 36 to place the valves, directly above a throat 20. Fig. 35 in connection with Fig. 30 shows that the valves should be further placed alternatively in two planes, so that the combustion chambers surrounding and concentrating over said valves, have more room between them for the partitions between them, and eventually the cooling fluid between them. The distance at which adjacent cylinders are placed is practically decided by the periphery of the combustion chambers. Without showing the exact outline of the chambers in Fig. 30, it is evident from Fig. 30, that there is more room for the valves and the chambers, and the cylinders can be brought closer to each other. At the same time these chambers will differ slightly from each other on account of the different slant of the two sets of valves, but this difference is not noticeable in practice.

In Fig. 36, 1 is the cylinder, 13 the piston reciprocating therein, 15 is the cylinderhead, 10 is the combustion chamber in said head, overlapping the cylinderbore partially at one side thereof, and containing the sparkplug 21 and the valves 11, two per cylinder. These valves are inverted, and are operated directly by a camshaft 9, having cams, and rotating at half engine speed. The combustion chamber 10 communicates with the piston-chamber through a restricted passage 20, which is shown in horizontal section in the corresponding cross-sectional view of Figs. 31, 32 and 34, having the cylinders and valves in alternate relative positions, as already explained. The piston in top position is supposed to approach the undersurface of said cylinderhead 15 at a distance greater than a minimum clearance, necessary for mechanical reasons. The advantage of said construction will be explained shortly in view of my Patent 1,666,160, 17 April 1928, page 4, lines 78–105. In this latter sleeve valve type the piston approaches also the undersurface of the head, by preference at a distance of about $\frac{1}{16}$ to $\frac{3}{16}$ of an inch ($\frac{1}{32}$ or less, being about the minimum). In this type the explosion force comes already always on the piston perpendicular on the center of the piston on the entire surface of the piston; equally if this clearance was reduced to a minimum so that the explosion pressure, after ignition took place before the piston was in top position, comes only on a part, the center part, of the piston. In the standard Ricardo head, however, in which, according to Patent 1,474,003, Nov. 13, 1923, the clearance should be a minimum, the explosion pressure will be during a moment on that side of the piston, which is located right under the throat between combustion chamber and piston chamber, causing the piston to tip in the cylinder irrespective of the direction of rotation of the crankshaft, and eventual offset of the piston pin and crankshaft.

If said crankshaft rotates clockwise, the piston will form a position slightly before its top position, to a position slightly below that, shift gradually from the cylinderwall opposite the combustion chamber, where the valves are located, to the cylinderwall below combustion chamber and throat. If the crankshaft rotates counterclockwise the piston will move reversely, due to the angularity of the connecting rod, from the cylinderwall below the throat, to the opposite side of the cylinderwall. This is explained in extenso in patent to E. F. Roberts 1,138,892, May 11, 1915, and the patent to J. G. Vincent No. 1,698,078, Jan. 8, 1929, in which patents offsets of the piston-pin are proposed, which are exactly each others opposite. The different offset is, however, related with the form of the combustion chamber, which overlaps in the second patent the cylinder bore, whereby the pressure between the piston-top in top position and the undersurface of the head is considered of extreme importance for which reasons also in this latter patent, like in the said Ricardo Patent 1,474,003, a minimum of clearance is considered as imperative. In the present arrangement substantially more than a minimum is considered necessary, to prevent piston slap on account of unequal pressures on the piston head due to said offset combustion chamber. This substantial clearance is imperative, as carbon accumulation happens so quick in ordinary motors, that $\frac{1}{16}$ of an inch is formed on head and piston together, before the valves need grinding for compression. In fact, I found, that if a motor uses more or less cheap oil, that even a clearance of 2/16 of an inch will gradually be ($\frac{1}{16}$ on the piston head, $\frac{1}{16}$ on the undersurface of the head), eliminated by the formation of carbon, so that piston slap and pinking will appear even with such a clearance. However, with the use of a good grade of oil, and good piston rings, a clearance of $\frac{1}{16}$ to $\frac{3}{16}$ of an inch is sufficient to avoid the effects of carbon formation a long time (over 20,000 miles for an automobile). At the same time, this small clearance space retains the squeezing effect between the piston head and the undersurface of the head. The turbulence created by the throat between combustion chamber and piston-chamber, is greatly increased at the very last moment by said squeezing effect, and accelerates the propagation of the flame appreciably, so that, both features, the throat as well as the clearance, are necessary for an efficient motor.

The function of said clearance space, has been proposed and explained differently in applications, made after this parent application 152,708 Dec. 4, 1926, and No. 18,456, March 26, 1925 (resulting respectively in Patents No. 1,776,760, 23 Sept. 1930 and No. 1,666,160, 17 April, 1928). In Patent 1,749,327 to W. B. Earnshaw, March 6, 1930, and in Patent 1,757,399 to A. Taub May 6, 1920, it is maintained that the importance of said clearance space is purely thermodynamical, instead of mechanical, as I claim. Detonation is, they say, caused simply by an excessive temperature in a part of the unburned gas, raised in temperature by the pressure of the already burned part of the gas. If a temperature of about 1440° Fahrenheit is reached, a part of the unburned gas having reached such a temperature, detonates and causes piston slap, and said well known metallic noise, "pinking". They reason further, that if the gas is ignited away from said clearance space, that the unburned part will be squeezed into said clearance, and will cool off to such a degree that said temperature is not reached. Therefore the compression can be raised safely and the thermal efficiency can be raised equally, or in proportion. There may be some truth in said theory, but the facts oppose it. In a sleeve valve engine, in which the clearance space has the form of an annular ring (see Patent 1,666,160) the clearance can be made a minimum $\frac{1}{32}$ of an inch and the compression can be raised as high, as when a clearance of $\frac{1}{16}$ to $\frac{3}{16}$ of an inch between piston and head is provided. With other words, if said greater clearance space actually cooled, the compression could be raised here, but it cannot be raised appreciably. In a poppet valve motor, be it the L-head or valve-in-head motor as shown respectively in Figs. 35 and 36, this increase of clearance makes, however, a great difference. If the clearance is a minimum from the very start, when no carbon has yet accumulated, the piston slap is pronounced with standard advance of spark. If the clearance is increased the pinking disappears suddenly until sufficient carbon accumulation has filled up said clearance. This proves that the original mechanical explanation is the only right one, substantiated by the experimental facts, as gradually accumulated by me.

Though, of course, the construction of the throat between combustion chamber and piston chamber, together with the inverted position of one or two valves over said throat, (plus the importance of said clearance in addition thereto) is theoretically independent of the arrangement of the cylinders and the crankpins, it is thereto connected from a mechanical standpoint. As explained the valve-in-head type is imperative for the multirow engine. The turbulance construction in the explosion chamber (throat plus clearance) is equally necessary from a mechanical standpoint. The slant position of the valves, especially the inlet is also advantageous in improving even the already favorable volumetric efficiency of the explained particular position of said valve(s) above said throat, and said slant position is related to the alternative position of the valves on opposite sides of the plane of the cylinders for the present arrangement of the cylinders in line. (Also for the staggered arrangement of the cylinders, as claimed in the parent case).

The outline of the combustion chamber outside and beyond the cylinderbore, has not been shown in Figs. 31, 32, 34, as this may be as desired, provided the throat, the inverted position of the valve(s), and the explained clearance, are there. However, if the cylinders are arranged in line, these combustion chambers would be in each others way, when they were constructed on the same side of the row of cylinders. They would be also in each others way, when the cylinders are staggered, and when placed at the same side, or in the same plane as shown in Fig. 32. unless of course the cylinders are liberally spaced from each other. In multicylinder engines, especially if moreover multirow, it is advantageous to keep the cylinderlength a minimum, and if the valves are of liberal size, about a little less than half the cylinderbore, the in-line position of said valves is not advisable, though possible. If an engine is provided with intermediate bearings between adjacent crankthrows, the cylinders have to be spaced anyway, to allow space for said bearings, and the valves can therefore be placed at a row in one plane. If these bearings are omitted, the cylinders can be closer together, and the alternate position of the valves and combustion chambers, as shown, becomes very convenient.

It is understood, that the alternate position of said combustion chambers on opposite sides of the plane of the cylinders, as shown for the valve-in-head type, can also be applied similarly on the L-head construction of Fig. 35. Only in the latter case a double camshaft is necessary for a single row of cylinders. For multirow engines, of course, these camshafts may operate the valves of two rows of cylinders, adjacent to each other. For a V-type, there would be three camshafts, for a double V type only four camshafts, as many as for the valve-in-head type. Any number of rows, in fact, exceeding two, f. i. the Y type, needs only as many camshafts as there are rows of cylinders, being in this respect equal to the type of Fig. 36. However, as said, if these radially adjacent rows of cylinders have a sharp angle, it will be here less hard to get at the valves, though easier than when all the valves are placed at one side of the cylinder, as shown in Fig. 30. However, as explained, the cylinders can be brought as close to each other, in this arrangement of Fig. 30, as when the valves are placed alternatively at opposite sides of the cylinders, as shown in Fig. 31, and 34 for the valve-in-head type.

Finally, it can be seen from Figs. 35 and 36, that the piston protrudes a little into the cylinderhead. This construction is not imperative for the throat and clearance as proposed, but has certain other advantages. The explosion occurs, when the piston moves near its top position. The temperature at that time is excessive and the cylinder head only will be exposed to said excessive heat. The clearance between the piston in top position and the cylinderhead may be further in the head, so that the piston top comes only as far as the dividing line between head and cylinder. In Patent 1,537,775, May 12, 1925, to I. J. Kelly, a clearance of about $\frac{3}{16}$ of an inch is provided in Fig. 2, but the restricted passage between combustion chamber and piston chamber is not shown nor described, nor claimed (Fig. 7). Finally a few examples are given, how much the angle of offset of the right and left half of the crankpins of a crankshaft, should be to obtain regular firing for an engine having f. i. four rows of cylinders in two planes. In case of the four cylinder type, the angle between the crankpins 1 and 4, and 2 and 3 has to be increased to 90°. The same can be done for the type of Fig. 6. In the case of the six cylinder, the angle between crankpins 1 and 6, 2 and 5, 3 and 4, should be again 30°. The type of Fig. 15 should be preferred above that of Fig. 14, though both can be used. In the case of the eight cylinder the type of the four cylinder has to be duplicated to avoid simultaneous firings. One set of four crankpins in two planes at 90° should be again at an angle of 22,5° to the other four crankpins, arranged in two planes at 90°. The types of Figs. 23–28, or 29 can only be used when there are 3, 5, etc. rows, of cylinders, said cylinders not applied in two planes at 45°, but at 120°, 72° etc., the angle of the two planes of crankpins being at respectively 90°, 90° etc.

In general it can be said, that in engines with an unequal number of rows of cylinders, the crankpins can remain in standard arrangement as shown in Figs. 5, 12, 13, 29. If the number of rows is equal, and especially if four rows of cylinders are arranged in two radial planes, the crankpins of the four, six and eight cylinder type have to be arranged in 4, 6, 8 radial planes, as shown in Figs. 6, 8, 14, 15, and the duplication of Figs. 6 and 8 for the eight cylinder. The computation of every particular type being a matter of arithmetic, provided the form of Figs. 6, 8, 14, 15 are taken as a basis to start from.

I claim:

1. In an internal combustion engine, having at least one row of cylinders in line, at least four and a multiple of two, cylinderheads on said cylinders, inverted valves in said heads, said inverted valves overlapping said cylinderbore, said valves inverted at a slant, with their stems towards the plane of the cylinders, said inverted valves opening downwardly into combustion chambers in said heads, said combustion chambers located alternately on opposite sides of the plane of the cylinders.

2. In an internal combustion engine, the combination of a cylinder, a piston reciprocating therein, a cylinderhead, a combustion chamber in said head communicating with the space in the cylinder swept by the piston, through a restricted passage formed by said cylinderhead and cylinder at one side of said cylinder, an inlet and exhaust valve and ignition means in said combustion chamber, both of said valves located in inverted position near and above said restricted passage, the cross section of said passage being substantially greater than the cross section of the inlet valve and inlet-valve passage.

3. The combination of claim 2, in which said two valves per cylinder slant with their valvestem towards the plane of the respective cylinders placed in a row, said sets of two valves operated from a single overhead camshaft placed over said cylinders.

4. The combination of claim 2, which is applied on the cylinders of an engine, placed in a row, said combustion chambers, however, placed alternately on opposite sides of the plane of said cylinders.

5. The combination of claim 2, which is applied on the cylinders of an engine, having at least one row of four cylinders placed radially with respect to the axis of a crankshaft for said engine, said combustion chambers placed on alternative sides of the plane of said rows of cylinders, said valves placed in inverted position in said combustion chambers, a single separate overhead camshaft for each row of said cylinders, said arrangement of combustion chambers allowing a closer position of the cylinders, than when said combustion chambers were placed at the same side of the cylinders, said arrangement being further of particular advantage in multirow engines, to decrease the length and weight of said engines.

6. In an internal combustion engine of the explosive type, the combination of a cylinder, a piston reciprocating therein, a cylinderhead closing said cylinder, a combustion chamber in said head communicating with the said cylinderbore through a restricted passage formed by said head and cylinder and having a cross section less than the cross section of said cylinderbore or the cross section of said combustion chamber in a plane perpendicular to the axis of said cylinder, an inlet and exhaust valve in inverted position near and above said restricted passage, opening downwardly into said combustion chamber towards said restricted passage, ignition means in said combustion chamber.

7. In an internal combustion engine, a cylinder, a piston reciprocating in said cylinder, a combustion chamber adjoining and communicating restrictedly with the end of said cylinder, said combustion chamber representing substantially all of the effective combustion space when the piston is in the position of greatest compression, and the cross sectional area of the communication between said combustion chamber and said cylinder being less than that of the cylinderbore, combustible gas inlet and burned gas outlet passages for said combustion chamber, said combustion chamber being otherwise closed, valves in inverted position for said passages opening downwardly into said chamber near and above said restricted passage and overlapping said cylinderbore, sparkignition means in said combustion chamber.

8. The combination of claim 2, in which said inlet and exhaust valves extend their stems at an angle towards the plane through the axis of said cylinder and the axis of the piston pin in said cylinder.

9. In an internal combustion engine having at least four cylinders, each cylinder having a piston reciprocating therein, each having a combustion chamber in the cylinderhead of said engine, each combustion chamber having an inlet and an exhaust valve in inverted position and opening downwardly into said chamber, each chamber communicating restrictedly with its corresponding cylinderbore, said restricted communication or throat formed by the upper edge of said cylinderbore and said cylinderhead at one side thereof, and having an area less than the cylinderbore, at least one of said valves overlapping its respective cylinderbore, spark-ignition means in said respective combustion chambers.

10. The combination of claim 9, in which said combustion chambers are located alternatively at opposite sides of a vertical plane through the axes of said cylinders.

11. The combination of claim 9, in which said combustion chambers are located alternatively at opposite sides of a vertical plane through the axes of said cylinders, said valves arranged at a slant alternatively in pairs towards said plane, inlet and exhaust passages connecting with said inlet and exhaust valves extending alternatively from said valves towards opposite sides of said vertical plane, said valves lifted by an overhead camshaft above said cylinders.

12. An overhead valve internal combustion engine, having at least one cylinder, a piston reciprocating inside said cylinder, a cylinderhead closing said cylinder, a combustion chamber in said head communicating with said cylinder through a restricted passage having a cross section less than said cylinderbore and less than the horizontal cross section of said combustion chamber at any point above said restricted passage, said overhead inlet and exhaust valve opening downwardly into said combustion chamber so that at least a part of the circumference of the head of said valve comes in close proximity of the edge of said restricted passage between said combustion chamber and cylinder, ignition means closer to the edge of the heads of said valves than to said restricted passage and cylinder bore.

13. The combination of claim 12, in which said valves are arranged at a slant towards a vertical plane through the axis of said cylinder and through the axis of the piston pin of the piston in said cylinder, said valves lifted directly by an overhead camshaft.

14. A cylinderhead for an engine cylinder and associated piston having a combustion chamber above the cylinder and having intake and exhaust valves substantially aligned longitudinally of the engine and carried by the cylinderhead in the top of the combustion chamber an opening inwardly of the combustion chamber toward the piston face, said cylinderhead having an inwardly extending part closely overlying a portion of the piston, when in the outer limit of travel for producing turbulence of the fuel mixture, the combustion chamber having a wall substantially opposite the said projecting part curved upwardly from the cylinder and inwardly toward the valves.

15. A cylinderhead for an engine cylinder and associated piston having a combustion chamber above the cylinder and having intake and exhaust valves substantially aligned longitudinally of the engine and carried by the cylinderhead in the top of the combustion chamber and opening inwardly of the combustion chamber toward the piston face, said cylinderhead having an inwardly extending part closely overlying a portion of the piston when in the outer limit of travel for producing turbulence of the fuel mixture, said cylinderhead part being located to one side of a plane longitudinally of the engine containing the cylinderaxis, said combustion chamber lying substantially below said intake and exhaust valves.

16. A cylinderhead for an engine cylinder and associated piston having a combustion chamber above the cylinder and having intake and exhaust valves substantially aligned longitudinally of the engine and carried by the cylinderhead in the top of the combustion chamber and opening inwardly of the combustion chamber toward the piston face, said cylinderhead having an inwardly extending part closely overlying a portion of the piston when in the outer limit of travel for producing turbulence of the fuel mixture, said cylinder head part being located to one side of a plane longitudinally of the engine containing the cylinder axis, the combustion chamber having a wall on the other side of said plane curved upwardly and inwardly from the cylinder to the valves.

17. A cylinderhead for an engine cylinder and associated piston having a combustion chamber above the cylinder and having intake and exhaust valves substantially aligned longitudinally of the engine and carried by the cylinderhead in the top of the combustion chamber and opening inwardly of the combustion chamber toward the piston face, said cylinderhead having an inwardly extending part closely overlying a portion of the piston when in the outer limit of travel for producing turbulence of the fuel mixture, said cylinderhead being located to one side of a plane longitudinally of the engine containing the cylinder axis, the transverse combustion chamber walls extending substantially vertically from the cylinder to the valves, the combustion chamber having a wall on the side opposite to said projecting part extending solely below the intake and exhaust valves.

18. A cylinderhead for an engine cylinder and associated piston having a combustion chamber above the cylinder and having intake and exhaust valves substantially aligned longitudinally of the engine and carried by the cylinderhead in the top of the combustion chamber and opening inwardly of the combustion chamber toward the piston face, said cylinderhead having an inwardly extending part closely overlying a portion of the piston when in the outer limit of travel for producing turbulence of the fuel mixture, said cylinderhead part being located to one side of a plane longitudinally of the engine containing the cylinder axis, the combustion chamber having a wall on the other side of said plane curved upwardly and inwardly from the cylinder to the valves, the transverse combustion chamber walls extending substantially vertically from the cylinder to the valves.

J. A. H. BARKEIJ.